United States Patent [19]

Kashihara et al.

[11] Patent Number: 5,793,741
[45] Date of Patent: Aug. 11, 1998

[54] OPTICAL INFORMATION RECORDING MEDIUM

[75] Inventors: Toshiaki Kashihara; Kiyoshi Tanii, both of Osaka, Japan

[73] Assignee: Matsushita Electric Industrial Co., Ltd. Osaka, Japan

[21] Appl. No.: 635,824

[22] Filed: Apr. 22, 1996

[30] Foreign Application Priority Data

Apr. 21, 1995 [JP] Japan .................... 7-096793

[51] Int. Cl.$^6$ .................... G11B 7/00
[52] U.S. Cl. .................... 369/275.4; 369/275.1; 369/58
[58] Field of Search .................... 369/275.4, 275.1, 369/276, 277, 278, 280, 58, 54, 51

[56] References Cited

U.S. PATENT DOCUMENTS 5,128,920  7/1992  Yamamura .................... 369/58 X
5,220,556  6/1993  Shimizu .................... 369/275.1

FOREIGN PATENT DOCUMENTS 0 439 196  7/1991  European Pat. Off. .
0 479 577  4/1992  European Pat. Off. .
0 546 525  6/1993  European Pat. Off. .
0 559 449  9/1993  European Pat. Off. .

OTHER PUBLICATIONS

Patent Abstracts of Japan, vol. 18, No. 42 (P-1680) (1994).

*Primary Examiner*—Muhammad N. Edun
*Attorney, Agent, or Firm*—McDermott, Will & Emery

[57] ABSTRACT

To present a stable tracking signal with less change, in a recording medium possessing a discontinuous control information recording region of track groove and a data region by a continuous track. The track pitch of a preliminarily recorded control information pit portion region 3 is set larger than the track pitch of a data recording region 2 which is a continuous groove in a disk 1, and the tracking signal modulation degree of the both regions is nearly same, so that stable recording and reproducing may be realized.

12 Claims, 2 Drawing Sheets

$d_1 \geq d_2$

OPTICAL INFORMATION RECORDING MEDIUM

FIELD OF THE INVENTION

The present invention relates to an optical disk capable of recording and erasing high density information.

BACKGROUND OF THE INVENTION

An optical disk capable of recording and erasing high density information has each track divided into plural sectors in order to realize high speed access and high speed handling of data, in which track addresses and sector numbers are formed preliminarily in pits. Usually, drive control information relating to the disk is formed in pits over plural tracks on the disk, and the drive has the function of reading the control information when loading the disk into the drive so as to set various conditions of the drive. In the conventional disk, the track pitches were same in the information recordable region and control signal region. Accordingly, the differential signal amplitude in the state without tracking servo applied in order to follow the track is large in the continuous groove portion as shown in FIG. 4, and in the pit portions having control information, the amplitude of the tracking signal 14 is lowered to about ⅓ because the pit-free portions do not generate tracking signals, and thereby the tracking servo was unstable.

Thus, in the region composed of tracks continuous for at least a specific section, and forming control signals by pit structure or track deformation preliminarily, as compared with the data recording region used by the user for recording information, the tracking differential signal amplitude is lowered significantly. As a result, due to lowering of amplitude and S/N of the differential signal, and increase of influences of electrical and optical offset, the stability of tracking servo is lost. Besides, as the stability of tracking pitch becomes smaller, the degree of modulation of reading control signal information is lowered. Consequently, the reliability of reading control information is lost.

SUMMARY OF THE INVENTION

In the light of the above problems, the information recording medium of the invention is characterized by composing the control information recording region in a different geometrical profile from the data recording region of continuous groove, in order to stabilize the tracking servo of the control information recording region where high reliability is required in reading, and to suppress lowering of degree of modulation of reading signal, and varying at least one of the elements of geometrical profile, track pitch, track width, ratio of track width and track interval, and track depth, in the condition that the tracking signal amplitude may be nearly constant in the data recording region and control information recording region.

Moreover, as the condition effective for the system having a gain control circuit for normalizing the tracking signal by reflectivity, the degree of tracking modulation which is the ratio of the tracking signal amplitude and reflectivity is nearly constant in the data recording region and control information recording region.

By defining the pit width or the control information recording region narrower than the groove width of the data region of continuous groove, the degree of modulation in reproduction can be enhanced. Besides, by setting the track pitch of the control information recording region larger than the track pitch of the data recording region of continuous groove, the tracking differential signal amplitude can be set larger, and therefore stable operation of the tracking servo in the recording and reproducing apparatus way be realized, while the reading reliability of control information may be enhanced.

Still more, by further setting the pit depth of the control information recording region such deeper than the depth of continuous groove (usually $\lambda/8$, $\lambda$=laser beam wavelength), the signal modulation degree in reproduction can be improved.

DESCRIPTION OF THE PREFERRED EMBODIMENTS

Figure 1:
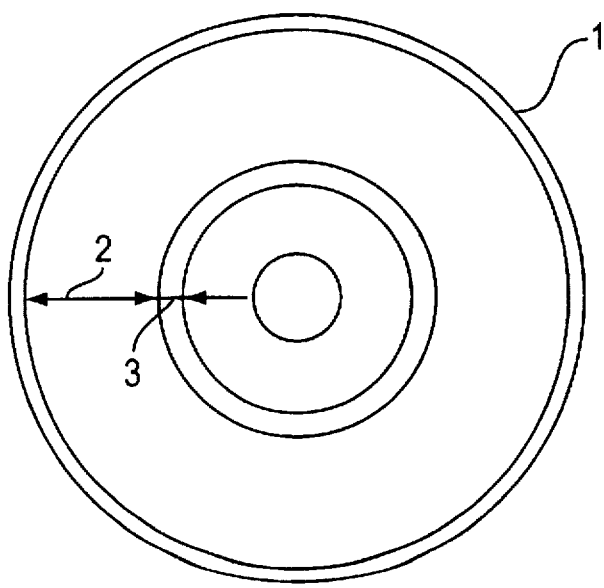
FIG. 1 is a top view showing a structure of a disk in an embodiment of the invention.
Figure 2:
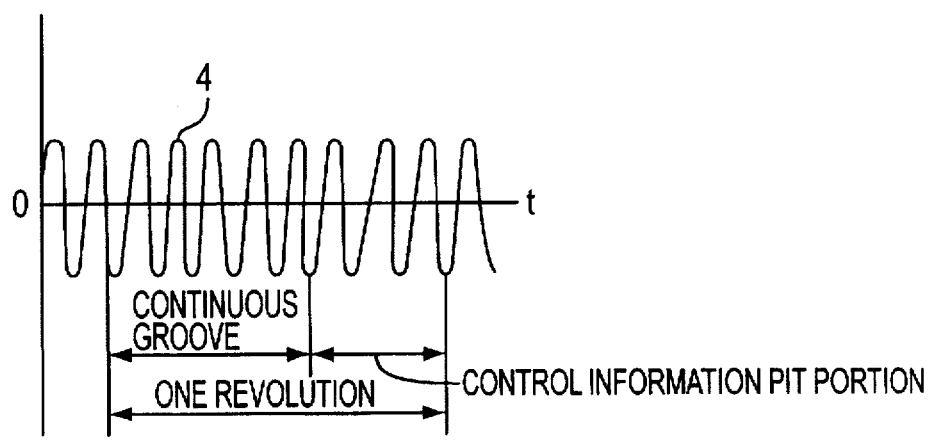
FIG. 2 is a waveform diagram of tracking differential signal according to an embodiment of the invention.

A first embodiment is shown in FIG. 1. The diagram is a structural diagram showing the top of a disk 1 having a track 3 of control information signal pit portion formed in the inner circumference of the disk. The control information signal pit portion and data recording region are both divided into sectors, and each sector has an address signal for access. When the track pitch of a continuous groove region 2 which is a data recording region is defined at 1.2 μm, and the track pitch of the control information signal pit portion region 3 which is a control signal recording region is defined at 1.6 μm, the tracking differential signal from the data recording region 2 to the control information signal pit portion region 3 is as shown in FIG. 2, in which lowering of tracking differential signal amplitude due to discontinuous pits of the control information signal pit portion can be guaranteed, so that there is almost no change in the continuous groove portion. Usually the control signal pit portion is prerecorded in at least two or more tracks. It is also effective to form a changeover region at track pitch of 1.6 μm in continuous groove, over one to ten tracks, in the tracks of the changeover portion of region.

In thus constituting, the tracking signal amplitude in both regions may be nearly identical. For example, the track pitches are explained at 1.2 μm and 1.6 μm, but they are variable with the laser wavelength to be used or the condition of the optical system for forcusing the spot, and it is possible to realize at other track pitch values.

In the embodiment, the tracking signal amplitude is matched, but in the conventional recording and reproducing apparatus relating to the invention, the circuit for dividing the servo signal by the reflectivity and normalizing the amplitude is often incorporated, and therefore as an example of disk dealing with such apparatus, the track pitch of the continuous groove region 2 which is the data recording region is defined at 1.2 μm for example, and the track pitch of the control information signal pit portion region 3 which is the control signal recording region is defined at 1.4 to 1.5 μm for example, and since the reflectivity is slightly lowered due to scattering by pits in the control information pit portion region, the condition is set to lower the tracking signal amplitude also depending on its lowering rate, and the tracking differential signal from the data recording region after passing through the gain control circuit for normalizing at the reflectivity in the recording and reproducing apparatus to the control information signal pit portion region may be set almost the same as shown in FIGS. 2, so that a further stabilization may be realized. By selecting the condition in this way, in order to set the degree of modulation of tracking error signal nearly same in the control information recording region and in other regions, the track pitch is varied, so that a stable tracking differential signal may be obtained.

Moreover, in the embodiment, the control information pit portion region is explained a certain region near the innermost circumference, but this is not limited, and depending on the specification of the recording and reproducing apparatus, it may be also provided in the outermost circumference, or in the middle portion of the disk, or, not limited to one location, in plural positions including the innermost circumference, outermost circumference and middle.

Other embodiment for suppressing lowering of tracking differential signal amplitude is explained. The degree of tracking signal modulation (the amplitude normalized by reflectivity) is generally determined by the relation of full width half maximum (FWHM) of laser spot and track pitch, but it makes use of the nature that the degree of tracking modulation is greatest near the track duty of 1 where the FWHM of a spot and track width coincide nearly with each other, and in the case of this embodiment, the FWHM of a spot is larger than the track width in the portion of continuous track and by noticing that the disk specification in determined where the tracking modulation degree is slightly lower, and hence the tracking pitch of the largest degree of tracking modulation was set in the control information recording region. In this embodiment, the track pitch is about 1.2 μm in the data recording region, and about 1.5 μm in the control information pit portion region, and by compensating for the lowering portion of the tracking signal amplitude, nearly same degree of tracking modulation can be realized in the entire disk, so that stable recording and reproducing may be realized.

As the track pitch becomes smaller depending on the request of high density recording, it is required to keep the relation between FWHM of the laser spot and track width almost constant, and therefore the track interval becomes smaller than the track width. At this time, the track width ratio, or the ratio of the track width and track interval, is 1 or less. When the track pitch is large, the track interval is wider, and hence the track width ratio is 1 or more.

Figure 3:
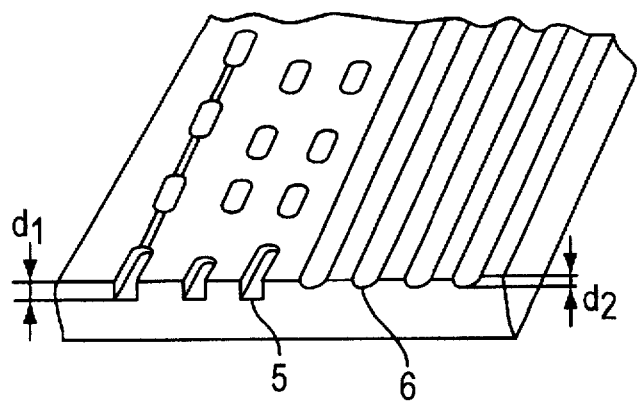
FIG. 3 is an essential perspective view showing a structure of a disk in other embodiment of the invention.
Figure 4:
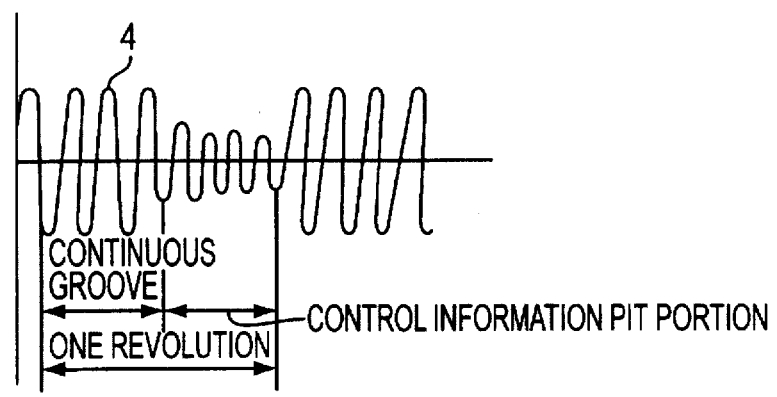
FIG. 4 is a waveform diagram of tracking differential signal in a prior art.

A further different embodiment is shown in FIG. 3. In FIG. 3, reference numerals 5 and 5b schematically show the pit row of control information pit portion, and relating to a separate arrangement of pits as in 6, and a modified example of continuous groove as in 5b, in which the shape similar to pits is realized and control information is recorded, but generally either format is used commonly on one disk. Reference numeral 6 shows a recording track by continuous groove in the data region, and it is used in recording the information of user. In part of the continuous groove, information of address or sector is recorded in a discontinuous form of track groove in the same depth as indicated by reference numeral 5, but it is not shown in the drawing. As mentioned above, as the geometrical condition of the track, by varying the track depth d1 of the control information pit portion region so as to be different from the track depth d2 in other regions, lowering of the tracking signal amplitude in the control information recording region can be suppressed. When the degree of modulation of tracking signal in the continuous groove portion reaches the maximum, the groove depth Is λ/8. However, when the track pitch becomes narrower, it is appropriate to set slightly shallower than λ/8 in order to maintain the property of molding fidelity. Since the control information pit portion is a discontinuous undulated structure, a sufficient property of molding fidelity is obtained if equivalent to λ/8 or much deeper.

In the combinations above, matching of the tracking signal amplitude and tracking modulation degree in the control information pit portion region and in other regions is also included in the scope of the invention.

The invention is so far described by referring to the optical disk, but it is evident that it can be applied not only in disk-shaped media, but also in card-shaped media, and optical recording media in other shapes.

Thus, according to the invention, in the recording medium recording address information as discontinuous or modified form of track groove, and having control information recording region continuously recording address information and other control information in specific region so by varying the geometrical conditions such as track pitch, track width ratio and depth between the control information recording region and other data regions, the tracking modulation degree and tracking signal amplitude in the both regions may be nearly equal in the specific recording and reproducing apparatus conditions, so that a great effect is brought about in stabilization of recording and reproducing and enhancement of reliability, in a simple constitution.

What is claimed is:

1. An optical information recording medium comprising,
   an information signal recording and reproducing track region forming a plurality of tracks having a specific depth or height and width, and
   a control information recording track region forming two or more tracks of a discontinuous or a modified form of track width, which differ in track pitch and geometrical conditions in the sectional shape of the track region from said information signal recording and reproducing track region,
   whereby the tracking signal amplitude of the control information track region is the same as the amplitude of the recording and reproducing track region.

2. An optical information recording medium of claim 1, wherein the control information recording track region differs in at least one of the conditions of the track pitch, track width ratio and track depth, and the tracking modulation degree which is the ratio of the tracking signal of the control information recording track region and the reflectivity of the recording film in the same region, and the tracking modulating degree in other regions than the control information recording track region are almost equal.

3. An optical information recording medium of claim 1, wherein the track pitch of the control information recording track region is larger than the track pitch in other regions.

4. An optical information recording medium or claim 1, wherein the track width ratio which is the ratio of the track width and track interval is different as the geometrical condition of the control information recording track region.

5. An optical information recording medium or claim 4, wherein the track width ratio of the control information recording track region is about 1, and the track width in other regions is larger than 1.

6. An optical information recording medium of claim 4, wherein the track width ratio of the control information recording track region is about 1, and the track width in other regions is smaller than 1.

7. An optical information recording medium of claim 1, wherein the track depth is different as the geometrical condition of the control information recording track region.

8. An optical information recording medium of claim 7, wherein the track depth of the control information recording track region is larger than the track depth in other regions.

9. An optical information recording medium of claim 1, wherein the control information recording track region differs in at least one of the conditions of the track pitch, track width ratio and track depth, and the amplitude of the tracking signal which is a signal for following up the track is nearly equal in both regions.

10. An optical information recording medium of any one of claims 1, 3, 4, 5, 6, 7, 8, 9, and 2, further comprising, a recording layer capable of recording and reproducing, or recording, reproducing and erasing the information signals.

11. An optical information recording medium of any one of claims 1, 3, 4, 5, 6, 7, 8, 9, and 2, wherein the control information recording track region is provided in the disk inner circumference.

12. An optical information recording medium of any one of claims 1, 3, 4, 5, 6, 7, 8, 9, and 2, wherein the control information recording track is provided in the disk outer circumference.

* * * * *